United States Patent
Heurtier et al.

(10) Patent No.: US 9,461,466 B2
(45) Date of Patent: Oct. 4, 2016

(54) OVERVOLTAGE PROTECTION DEVICE

(71) Applicant: STMicroelectronics (Tours) SAS, Tours (FR)

(72) Inventors: Jérôme Heurtier, Tours (FR); Guillaume Bougrine, Tours (FR); Arnaud Florence, Saint Antoine du Rocher (FR)

(73) Assignee: STMicroelectronics (Tours) SAS, Tours (FR)

( * ) Notice: Subject to any disclaimer, the term of this patent is extended or adjusted under 35 U.S.C. 154(b) by 96 days.

(21) Appl. No.: 14/229,018

(22) Filed: Mar. 28, 2014

(65) Prior Publication Data

US 2014/0293493 A1 Oct. 2, 2014

(30) Foreign Application Priority Data

Mar. 29, 2013 (FR) ...................... 13 52864

(51) Int. Cl.
*H02H 9/04* (2006.01)

(52) U.S. Cl.
CPC ............... *H02H 9/043* (2013.01); *H02H 9/04* (2013.01); *H02H 9/041* (2013.01); *H02H 9/042* (2013.01)

(58) Field of Classification Search
CPC .... H02H 9/04–9/048; H03K 17/082–17/0828
USPC ............................. 361/8, 13, 91.1
See application file for complete search history.

(56) References Cited

U.S. PATENT DOCUMENTS

| | | | | |
|---|---|---|---|---|
| 4,282,555 A * | 8/1981 | Svedberg | .............. | H01L 23/492 257/146 |
| 5,245,499 A * | 9/1993 | Senes | .............. | H02H 9/04 257/E29.337 |
| 5,272,363 A * | 12/1993 | Pezzani | ............... | H02H 9/04 257/121 |
| 5,422,777 A * | 6/1995 | Pezzani | ............... | H04M 3/18 361/111 |
| 5,828,112 A * | 10/1998 | Yamaguchi | ............ | H01L 27/0635 257/337 |
| 5,969,922 A * | 10/1999 | Pezzani | ............... | H01L 27/0248 257/528 |
| 6,331,763 B1 | 12/2001 | Thomas et al. | | |
| 6,707,171 B1 * | 3/2004 | Huenner | ................. | B60L 3/00 307/113 |
| 7,391,133 B1 * | 6/2008 | Hennessy | ........... | H03K 17/102 307/113 |
| 7,593,204 B1 | 9/2009 | Iversen et al. | | |
| 9,144,121 B2 | 9/2015 | Frias, Sr. | | |
| 2005/0219783 A1 * | 10/2005 | Hunner | ................. | B60L 3/00 361/91.5 |
| 2008/0192394 A1 | 8/2008 | Harris | | |
| 2013/0153958 A1 * | 6/2013 | Kurachi | ................. | H01L 23/48 257/164 |
| 2013/0329328 A1 | 12/2013 | Wang et al. | | |
| 2014/0293491 A1 | 10/2014 | Robbins | | |
| 2015/0092307 A1 * | 4/2015 | Petruzzi | ................ | H02H 9/043 361/56 |

FOREIGN PATENT DOCUMENTS

| | | |
|---|---|---|
| DE | 10221714 A1 | 11/2003 |
| EP | 0818867 A1 | 1/1998 |
| WO | 2010/037579 A1 | 4/2010 |

* cited by examiner

*Primary Examiner* — Stephen W Jackson
*Assistant Examiner* — Christopher Clark
(74) *Attorney, Agent, or Firm* — Seed IP Law Group PLLC

(57) ABSTRACT

An overvoltage protection device capable of protecting a power supply line and including in parallel a break-over diode, a controlled switch, and a circuit for controlling the switch.

19 Claims, 2 Drawing Sheets

OVERVOLTAGE PROTECTION DEVICE

BACKGROUND

1. Technical Field

The present disclosure relates to an overvoltage protection device, and more specifically to an overvoltage protection device capable of protecting a power supply line.

2. Description of the Related Art

An overvoltage protection device is a component or circuit which turns on when the voltage thereacross exceeds a given threshold, called breakdown voltage, and generally designated as $V_{BR}$.

A first type of protection component is of avalanche diode type, with a current-vs.-voltage characteristic illustrated in FIG. 1. When the voltage across this component exceeds breakdown voltage $V_{BR}$, the component turns on. Ideally, the voltage across the component remains equal to $V_{BR}$ while the current increases. Indeed, as shown in FIG. 1, the characteristic is not vertical and the voltage across the component exceeds value $V_{BR}$ while the overvoltage is absorbed, that is, a current I of strong value crosses the component.

A disadvantage of this type of component is that during the overvoltage absorption phase, the voltage across the component remains greater than or equal to breakdown voltage $V_{BR}$, that is, during this phase, the component has to absorb a power greater than $V_{BR} \times I$. This results in having to form a component having sufficiently large size to be able to absorb this power without being destroyed. Currently, for voltages $V_{BR}$ greater than 100 volts, for example, on the order of 300 volts, this results in component sizes greater than several cm$^2$, for example, on the order of 10 cm$^2$. Such components are however made in the form of a stack of diode chips, for example, a stack of fourteen elementary components each having a surface area of 8.6×8.6 mm$^2$ to reach a 430-V breakdown voltage. Such components are thus expensive and bulky.

A second type of protection component is of break-over type, of Shockley diode type, or of gateless thyristor type. The current-vs.-voltage characteristic of a break-over component is illustrated in FIG. 2. When the voltage across the component exceeds breakdown voltage $V_{BR}$, this voltage rapidly drops and then follows a substantially vertical characteristic I.

An advantage of this second type of component is that the power dissipated by the overvoltage in the component is low as compared with the power dissipated in a device of avalanche diode type, given that the voltage across the component is very low during the overintensity flow. A disadvantage of this second type of component is that, as long as there is a voltage across the component, said component remains on, the protection component only turning back off if the voltage thereacross is such that the current in this component becomes smaller than a hold current $I_h$. For a protection component having its breakdown voltage $V_{BR}$ approximately ranging from 50 to 1,000 volts, this hold current currently has a value approximately ranging from 100 mA to 1 A according to the breakdown voltage of the component.

Accordingly, break-over type protection components are reserved for circuits where these components are intended to protect a line having an operating voltage crossing zero values—this being in particular true for a data transmission line.

As illustrated in FIG. 3, if a line L1 forming a power supply line connected to the output of a power supply device such as a solar power plant 10, for example connected to an inverter 12, is desired to be protected, a break-over protection component can normally not be used since, after the occurrence of an overvoltage, for example corresponding to a lightning surge on line L1, the voltage on line L1 remains positive and the protection component remains conductive.

As illustrated in FIG. 4A, after application of the overvoltage, voltage $V_{DC}$ at the output of power supply source 10 is short-circuited and a short-circuit current $I_{SC}$ flows therein. The source sees across its terminals internal resistance Ri and on-state resistance $R_D$ of the protection diode. A voltage $V_D = V_{DC}(R_D/(Ri+R_D))$ then exists across the protection diode.

FIG. 4B shows a portion of the characteristic curve of the diode corresponding to this specific case. In most practical configurations, potential $V_D$ corresponding to short-circuit current $I_{SC}$ is much greater than voltage $V_h$ corresponding to hold current $I_h$ of the break-over component. As an example, for a 150-mA hold current $I_h$, voltage $V_h$ may be on the order of 2V. It is thus a priori not possible to use a break-over component to protect a D.C. power supply line. Protection devices of avalanche diode type, which have significant surface areas and thus a high cost, thus are used.

It is here desired to overcome this disadvantage.

BRIEF SUMMARY

Thus, an embodiment provides an overvoltage protection device capable of protecting a power supply line comprising in parallel a break-over diode, a controlled switch, and a circuit for controlling the switch.

According to an embodiment, the break-over diode is in series with an avalanche diode having a breakdown voltage at least ten times lower than the break-over voltage of the break-over diode.

According to an embodiment, the protection device has a breakdown voltage ranging between 50 and 1,000 volts.

According to an embodiment, the control circuit comprises an overvoltage detector and is capable of turning on the switch for a determined time period, some time after the overvoltage will have been detected, and then of turning off the switch after a determined time.

According to an embodiment, the control circuit comprises a detector of the voltage across the diode and is capable of turning on the switch when the voltage across the diode is within a given range, corresponding to the value of the voltage across the diode when said diode is shorted, and then of turning off the switch after a determined time.

The foregoing and other features and advantages will be discussed in detail in the following non-limiting description of specific embodiments in connection with the accompanying drawings.

DETAILED DESCRIPTION

Figure 5:
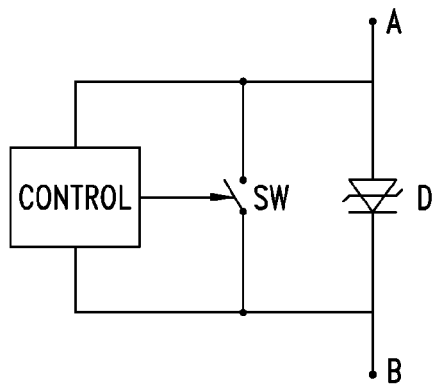
FIG. 5 shows a first embodiment of a protection device.

FIG. 5 shows a first embodiment of a protection device. This protection device comprises between two terminals A and B the parallel assembly of:

a break-over type protection diode D, a switch SW, and a circuit (CONTROL) for controlling switch SW.

The protection device of FIG. 5 operates as follows.

Figure 3:
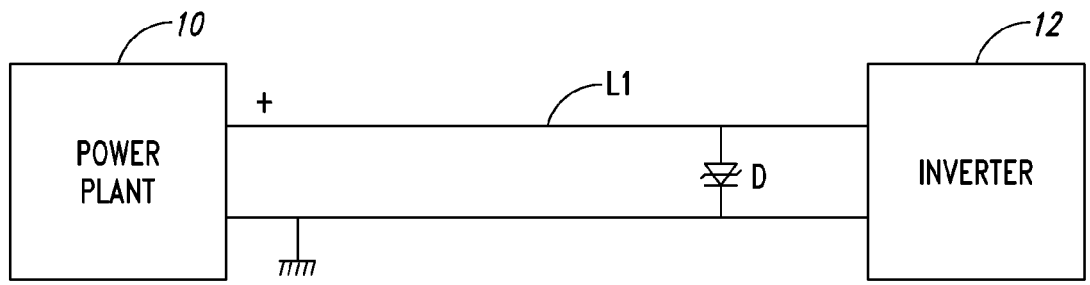
FIG. 3, previously described, shows a protection diode of break-over type connected to a D.C. power supply line.
Figure 4A:
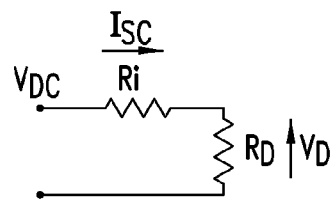
FIG. 4A, previously described, shows an equivalent diagram of the assembly of FIG. 3 in short-circuit.
Figure 4B:
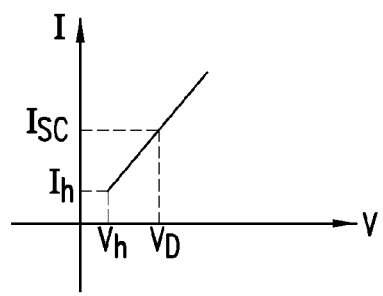
FIG. 4B, previously described, shows the characteristic of a break-over device in the case of FIG. 4A.

In the idle state, switch SW is off. Terminals A and B are connected across a D.C. power supply line so that the protection is for example connected like diode D of FIG. 3. As long as the voltage between terminals AB remains lower than the breakdown voltage of break-over diode D, the protection device is non-conductive. When an overvoltage appears, the protection diode becomes conductive, which results in the configuration of FIG. 4A, that is, the power supply connected between terminals AB is shorted. Once the overvoltage has passed, diode D conducts a short-circuit current $I_{DC}$ such as defined in relation with FIG. 4A. At this time, switch SW is turned on so that the current between terminals A and B is branched by switch SW. If on-state resistance $R_{on}$ of switch SW is sufficiently low, the voltage between terminals AB becomes lower than voltage $V_h$ defined in relation with FIG. 4B.

Various types of control circuits (CONTROL) may be used to control the turning on and the turning off of switch SW. Such control circuits may comprise a processor or another timer.

Figure 5A:
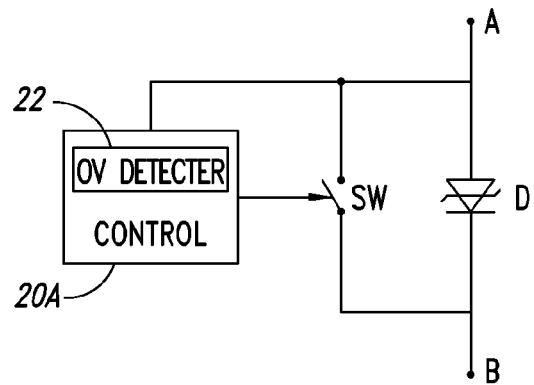
FIG. 5A shows an implementation of the first embodiment.

According to an embodiment shown in FIG. 5A, the control circuit CONTROL is implemented by a control circuit 20A that comprises an overvoltage detector 22 configured to detect an overvoltage at the terminal A. The control circuit 20A automatically turns on switch SW for a determined time period, some time after the overvoltage is detected by the overvoltage detector 22, and then turns off switch SW at the end of the time period.

Figure 5B:
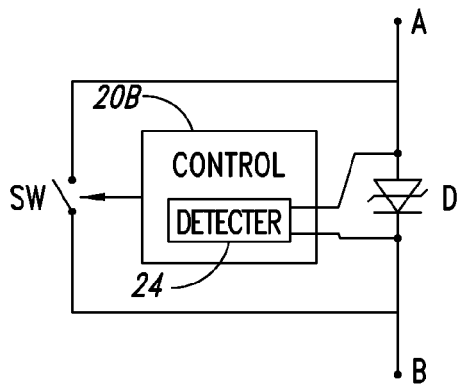
FIG. 5B shows another implementation of the first embodiment.

According to an embodiment shown in FIG. 5B, the control circuit CONTROL is implemented by a control circuit 20B that comprises a voltage detector 24 for detecting the voltage across diode D. As long as this voltage is lower than $V_{BR}$ and higher than $V_D$, the control circuit 20B will remain inactive. Then, after a first voltage drop, the control circuit will determine whether the voltage across diode D is within a given range, corresponding to value $V_{DC}(R_D/(Ri+R_D))$. The control circuit then determines the turning on and the turning off of switch SW.

The operation of the circuits of FIGS. 5, 5A, 5B is based on the fact that, when switch SW is in the conductive state, the voltage thereacross drops sufficiently to become lower than previously-defined value $V_h$. This implies that on-state resistance $R_{on}$ of switch SW must be much lower than apparent resistance $R_D$ of diode D when the device is shorted. It should be understood that this suggests to use a switch with a very low $R_{on}$, which is not always compatible with the desire to use low-cost switches, for example, small MOS transistors. If condition $R_{on} \times I_{SC} < V_h$ is too difficult to respect, an alternative embodiment such as illustrated in FIG. 6 may be provided.

Figure 6:
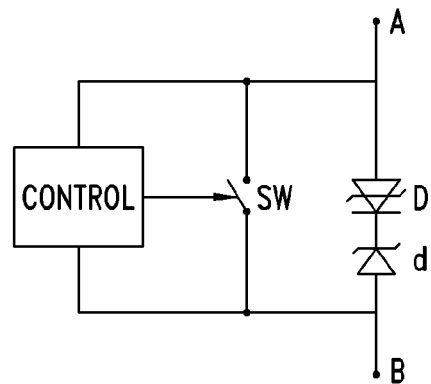
FIG. 6 shows a second embodiment of a protection device.

The variation of FIG. 6 comprises the same elements as the embodiment of FIG. 5 but further comprises an avalanche diode d of breakdown voltage $V_{br}$, having a low breakdown voltage $V_{br}$ as compared with breakdown voltage $V_{BR}$ of break-over diode D. For example, $V_{br}$ is lower than $V_{BR}/10$. The operation of the series assembly of break-over diode D and of avalanche diode d will be little different for the absorption of an overvoltage from the operation of diode D alone. This time, when the overvoltage has passed and the line is shorted, condition $R_{on} \times I_{SC} < V_h + V_{br}$ should be satisfied, which enables to use a switch having a higher $R_{on}$ than in the case of the assembly of FIG. 5.

Figure 7:
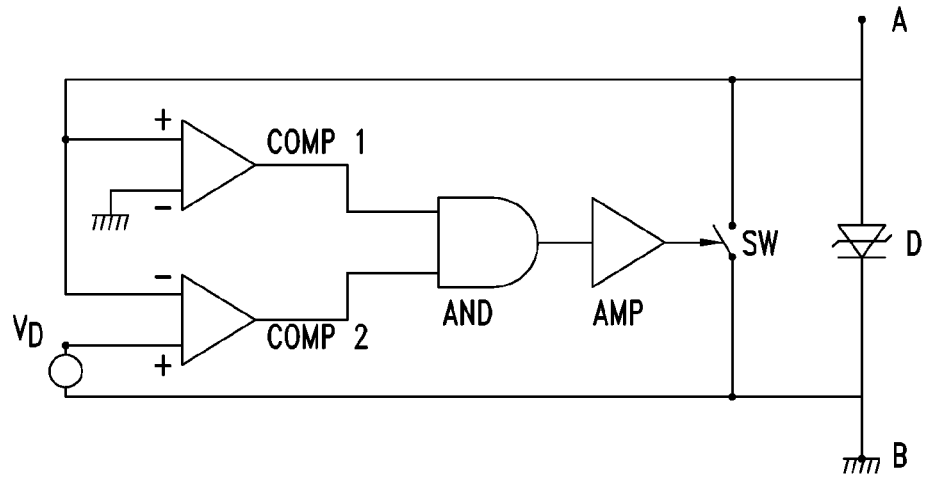
FIG. 7 shows an example of a circuit for controlling a protection device of the type in FIGS. 5 and 6.

FIG. 7 shows an embodiment of control circuit CONTROL. A first comparator COMP1 compares the voltage on the anode of the diode D to ground and delivers a 1 when the voltage is positive. A second comparator COMP2 compares the voltage on the diode anode with a threshold $V_D$ substantially corresponding to the voltage across the shorted diode and delivers a 1 when the voltage across the diode becomes lower than a value little greater than this short-circuit voltage. The outputs of the two comparators are sent to an AND gate having its output controlling switch SW via a buffer amplifier AMP. Amplifier AMP is for example formed of a chain of inverters in series.

Thus, switch SW is turned on for a short period when first comparator COMP1 has verified that the voltage across protection diode D is positive and when this voltage becomes close to a predetermined value $V_D$. It should be noted that comparator COMP2 does not start during the short period which immediately follows the arrival of the overvoltage, during which the voltage briefly drops below $V_D$ before increasing during the absorption of the overvoltage. This results either from the fact that the comparator is not fast enough to detect this short transition or from the fact that the reference voltage close to $V_D$ is delivered by a reference diode in parallel with a capacitor which branches fast transitions.

Thus, protection devices of the type described in relation with FIGS. 5 and 6 have the advantages of break-over protection devices in that they enable to use a break-over diode having a relatively small surface area, for example, 50 mm$^2$, while, as indicated previously, for protection voltages greater than from approximately 50 to 1,000 volts, protection avalanche diodes should have surface areas approximately ranging from 1 to 10 cm$^2$. The assembly of switching device SW, for example, a MOS transistor, and of the control circuit may for example have a surface area approximately ranging between 10 and 15 mm$^2$ only. Thus, the total surface area of the protection device is smaller than 65 mm$^2$, and the function ensured by an avalanche protection component having a surface area ranging from 1 to 10 cm$^2$ may be fulfilled. The device for example comprises two chips, one corresponding to the protection diode and the other to the switch and to its control circuit. These two chips may be assembled on a single support and form a simple dipole.

Figure 1:
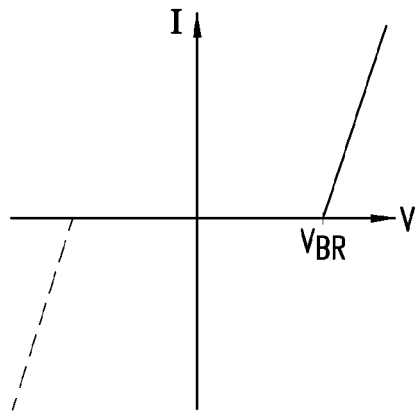
FIG. 1, previously described, shows the current-vs.-voltage characteristic of a protection device of avalanche diode type.
Figure 2:
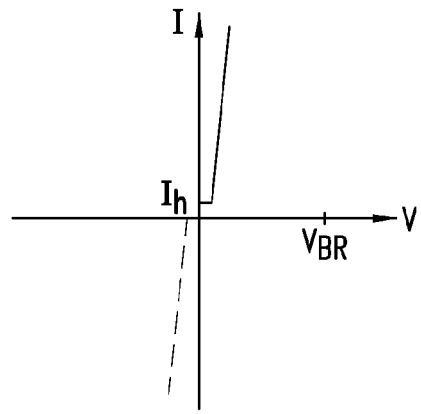
FIG. 2, previously described, shows the current-vs.-voltage characteristic of a protection device of break-over type.

Specific embodiments have been described. Various alterations, modifications, and improvements will readily occur to those skilled in the art. For example, only one-way protection diodes have been described herein. Of course, bidirectional protection diodes (having their characteristics illustrated in FIGS. 1 and 2, although they have not been described) may also be provided.

Further, the use of the protection component in association with a line biased to a D.C. voltage only has been described. This component may also be used in the case where the line is an A.C. power supply line, for example, at 50 or 60 Hz. Indeed, if the overvoltage occurs at the beginning of a halfwave, it may be desired for the protection diode to stop being conductive rapidly after the occurrence of an overvoltage without waiting for the end of a halfwave, the duration of a halfwave being 10 ms in the case of a power supply at 50 Hz.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An overvoltage protection device capable of protecting a power supply line, comprising:
    a diode component including a break-over diode connected between first and second terminals of the power supply line, the diode component being configured to conduct in response to an overvoltage across the first and second terminals exceeding a break-over voltage of the break-over diode,
    an electronic switch in parallel with the diode component, and
    a control circuit coupled to the break-over diode and configured to close the electronic switch after the overvoltage is no longer across the first and second terminals, wherein the electronic switch is configured to cause the break-over diode to not conduct in response to the electronic switch being closed, wherein the control circuit comprises:
    a first comparator configured to compare a voltage on an anode of the diode component to a reference voltage;
    a second comparator configured to compare the voltage on the anode with a threshold substantially corresponding to a voltage across the diode when conducting;
    an AND gate having first and second inputs respectively coupled to outputs of the first and second comparators; and
    a buffer amplifier coupled between an output of the AND gate and a control terminal of the switch.

2. The overvoltage protection device of claim 1, wherein the diode component includes an avalanche diode in series with the break-over diode and having a breakdown voltage at least ten times lower than a break-over voltage of the break-over diode.

3. The overvoltage protection device of claim 1, wherein the diode component has a breakdown voltage ranging between 50 and 1,000 volts.

4. The protection component of claim 1, wherein the control circuit is configured to detect the overvoltage and the control circuit is configured to turn on the switch for a time period in response to detecting the overvoltage, and turn off the switch when the time period elapses.

5. The protection component of claim 1, wherein the control circuit is configured to detect a voltage across the diode component and the control circuit is configured to turn on the switch in response to detecting that the voltage across the diode is within a given range, corresponding to a value of the voltage across the diode component when said diode component is conducting, and turn off the switch after a determined time.

6. An apparatus, comprising:
    a power supply line; and
    an overvoltage protection device configured to protect the power supply line, the overvoltage protection device including:
    a diode component including a break-over diode coupled to the power supply line and connected between first and second terminals of the power supply line, the diode component being configured to conduct in response to an overvoltage across the first and second terminals exceeding a break-over voltage of the break-over diode,
    an electronic switch in parallel with the diode component, and
    a control circuit coupled to the break-over diode and configured to close the electronic switch after the overvoltage is no longer across the first and second terminals, wherein the electronic switch is configured to cause the break-over diode to not conduct in response to the electronic switch being closed, wherein the control circuit comprises:
    a first comparator configured to compare a voltage on an anode of the diode component to a reference voltage;
    a second comparator configured to compare the voltage on the anode with a threshold substantially corresponding to a voltage across the diode when conducting;
    an AND gate having first and second inputs respectively coupled to outputs of the first and second comparators; and
    a buffer amplifier coupled between an output of the AND gate and a control terminal of the switch.

7. The apparatus of claim 6, wherein the diode component includes an avalanche diode in series with the break-over diode and having a breakdown voltage at least ten times lower than a break-over voltage of the break-over diode.

8. The apparatus of claim 6, wherein the diode component has a breakdown voltage ranging between 50 and 1,000 volts.

9. The apparatus of claim 6, wherein the control circuit is configured to detect the overvoltage and the control circuit is configured to turn on the switch for a time period in response to detecting the overvoltage, and turn off the switch when the time period elapses.

10. The apparatus of claim 6, wherein the control circuit is configured to detect a voltage across the diode component and the control circuit is configured to turn on the switch in response to detecting that the voltage across the diode is within a given range, corresponding to a value of the voltage across the diode component when said diode component is conducting, and turn off the switch after a determined time.

11. An apparatus, comprising:
    an electrical component configured to be coupled to a power supply line; and
    an overvoltage protection device configured to protect the electrical component from an overvoltage from the power supply line, the overvoltage protection device including:
    a diode component including a break-over diode connected between first and second terminals of the power supply line, the diode component being configured to conduct in response to an overvoltage across the first and second terminals exceeding a break-over voltage of the break-over diode, an electronic switch in parallel with the diode component, and a control circuit coupled to the break-over diode and configured to close the electronic switch after the overvoltage is no longer across the first and second terminals, wherein the electronic switch is configured to cause the break-over diode to not conduct in response to the electronic switch being closed, wherein the control circuit comprises:

a first comparator configured to compare a voltage on an anode of the diode component to a reference voltage;

a second comparator configured to compare the voltage on the anode with a threshold substantially corresponding to a voltage across the diode when conducting;

an AND gate having first and second inputs respectively coupled to outputs of the first and second comparators; and a buffer amplifier coupled between an output of the AND gate and a control terminal of the switch.

12. The apparatus of claim 11, wherein the diode component includes an avalanche diode in series with the break-over diode and having a breakdown voltage at least ten times lower than a break-over voltage of the break-over diode.

13. The apparatus of claim 11, wherein the diode component has a breakdown voltage ranging between 50 and 1,000 volts.

14. The apparatus of claim 11, wherein the control circuit is configured to detect the overvoltage and the control circuit is configured to turn on the switch for a time period in response to detecting the overvoltage, and turn off the switch when the time period elapses.

15. The apparatus of claim 11, wherein the control circuit is configured to detect a voltage across the diode component and the control circuit is configured to turn on the switch in response to detecting that the voltage across the diode is within a given range, corresponding to a value of the voltage across the diode component when said diode component is conducting, and turn off the switch after a determined time.

16. An overvoltage protection device capable of protecting a power supply line, comprising:

a diode component including a break-over diode connected between first and second terminals of the power supply line, the diode component being configured to conduct a shorting current through the break-over diode in response to a voltage across the first and second terminals exceeding a break-over voltage of the break-over diode, an electronic switch electrically connected in parallel with the diode component between the first and second terminals, and a control circuit coupled to the break-over diode and configured to control the switch, wherein the control circuit comprises:

a first comparator configured to compare a voltage on an anode of the diode component to a reference voltage;

a second comparator configured to compare the voltage on the anode with a threshold substantially corresponding to a voltage across the diode when conducting;

an AND gate having first and second inputs respectively coupled to outputs of the first and second comparators; and a buffer amplifier coupled between an output of the AND gate and a control terminal of the switch.

17. The overvoltage protection device of claim 16, wherein the diode component includes an avalanche diode in series with the break-over diode and having a breakdown voltage at least ten times lower than a break-over voltage of the break-over diode.

18. An overvoltage protection device capable of protecting a power supply line, comprising:

a diode component including a break-over diode, a controlled switch in parallel with the diode component, and a control circuit coupled to the break-over diode and configured to control the switch, wherein the control circuit comprises:

a first comparator configured to compare a voltage on an anode of the diode component to a reference voltage;

a second comparator configured to compare the voltage on the anode with a threshold substantially corresponding to a voltage across the diode when conducting;

an AND gate having first and second inputs respectively coupled to outputs of the first and second comparators; and a buffer amplifier coupled between an output of the AND gate and a control terminal of the switch.

19. The overvoltage protection device of claim 18, wherein the diode component includes an avalanche diode in series with the break-over diode and having a breakdown voltage at least ten times lower than a break-over voltage of the break-over diode.

* * * * *